United States Patent
Song et al.

(10) Patent No.: US 11,329,290 B2
(45) Date of Patent: May 10, 2022

(54) ELECTRODE ASSEMBLY AND SECONDARY LITHIUM BATTERY INCLUDING THE SAME

(71) Applicant: LG CHEM, LTD., Seoul (KR)

(72) Inventors: Jooyong Song, Daejeon (KR); In Chul Kim, Daejeon (KR); Juri Kim, Daejeon (KR); Hyun Min Kim, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 239 days.

(21) Appl. No.: 16/606,813

(22) PCT Filed: Nov. 30, 2018

(86) PCT No.: PCT/KR2018/015111
§ 371 (c)(1),
(2) Date: Oct. 21, 2019

(87) PCT Pub. No.: WO2019/108026
PCT Pub. Date: Jun. 6, 2019

(65) Prior Publication Data
US 2020/0388852 A1    Dec. 10, 2020

(30) Foreign Application Priority Data

Dec. 1, 2017   (KR) .................... 10-2017-0164085
Nov. 29, 2018   (KR) .................... 10-2018-0151236

(51) Int. Cl.
*H01M 4/62* (2006.01)
*H01M 4/04* (2006.01)
(Continued)

(52) U.S. Cl.
CPC ......... *H01M 4/628* (2013.01); *H01M 4/0404* (2013.01); *H01M 4/131* (2013.01);
(Continued)

(58) Field of Classification Search
CPC ......... H01M 10/0525; H01M 10/0585; H01M 4/0404; H01M 4/131; H01M 4/134;
(Continued)

(56) References Cited

U.S. PATENT DOCUMENTS

2007/0026316 A1   2/2007   Imachi et al.
2012/0328955 A1   12/2012   Ryu et al.
(Continued)

FOREIGN PATENT DOCUMENTS

CN   103891031 A   6/2014
JP   2011-108505 A   6/2011
(Continued)

OTHER PUBLICATIONS

Extended European Search Report and Examination Report from the European Patent Office dated Mar. 11, 2020 in connection with the corresponding European patent application No. EP18884817.0.
(Continued)

*Primary Examiner* — Carlos Barcena
(74) *Attorney, Agent, or Firm* — Morgan, Lewis & Bockius LLP

(57) ABSTRACT

Disclosed are an electrode assembly, and a secondary lithium battery including the same. The electrode assembly is configured by alternately stacking two or more positive electrodes and one or more negative electrodes using a separator as a boundary therebetween, outermost positive electrodes are positioned on outermost opposite surfaces of the electrode assembly, respectively, each of the outermost positive electrodes includes a positive electrode current collector, a positive active material layer formed on one surface of the positive electrode current collector, and a non-reversible material coating layer formed on the other surface of the positive electrode current collector and including lithium oxide, and the non-reversible material coating
(Continued)

layer is positioned on an outermost surface of the electrode assembly.

17 Claims, 3 Drawing Sheets

(51) Int. Cl.
| | |
|---|---|
| *H01M 4/131* | (2010.01) |
| *H01M 4/134* | (2010.01) |
| *H01M 4/38* | (2006.01) |
| *H01M 4/66* | (2006.01) |
| *H01M 10/0525* | (2010.01) |
| *H01M 10/0585* | (2010.01) |
| *H01M 4/505* | (2010.01) |
| *H01M 4/525* | (2010.01) |

(52) U.S. Cl.
CPC ............ *H01M 4/134* (2013.01); *H01M 4/386* (2013.01); *H01M 4/667* (2013.01); *H01M 10/0525* (2013.01); *H01M 10/0585* (2013.01); *H01M 4/505* (2013.01); *H01M 4/525* (2013.01)

(58) Field of Classification Search
CPC ...... H01M 4/386; H01M 4/505; H01M 4/525; H01M 4/628; H01M 4/667
See application file for complete search history.

(56) References Cited

U.S. PATENT DOCUMENTS

| | | |
|---|---|---|
| 2014/0212755 A1 | 7/2014 | Wu et al. |
| 2014/0255779 A1 | 9/2014 | Min et al. |
| 2016/0133933 A1 | 5/2016 | Choi et al. |
| 2017/0288207 A1 | 10/2017 | Kim et al. |
| 2019/0020030 A1 | 1/2019 | Umetsu et al. |

FOREIGN PATENT DOCUMENTS

| | | |
|---|---|---|
| JP | 2014-532955 A | 12/2014 |
| JP | 2015-122252 A | 7/2015 |
| JP | 2016-518012 A | 6/2016 |
| JP | 6227839 B1 | 11/2017 |
| KR | 10-2008-0099890 A | 11/2008 |
| KR | 10-2013-0001631 A | 1/2013 |
| KR | 10-2015-0029228 A | 3/2015 |
| KR | 10-1556299 B1 | 10/2015 |
| KR | 10-1613285 B1 | 4/2016 |
| KR | 10-1625822 B1 | 5/2016 |
| KR | 10-1667520 B1 | 10/2016 |
| KR | 10-2016-0128014 A | 11/2016 |

OTHER PUBLICATIONS

Park et al., "Li2NiO2 as a sacrificing positive additive for lithium-ion batteries," Electrochimica Acta, 108 (2013), 591-595.
International Search Report issued in corresponding International Patent Application No. PCT/KR2018/015111, dated Mar. 15, 2019.
Office Action issued in corresponding Indian Patent Application No. 201917042988 dated Mar. 16, 2022.

ELECTRODE ASSEMBLY AND SECONDARY LITHIUM BATTERY INCLUDING THE SAME

CROSS-REFERENCE TO RELATED APPLICATION

This application claims priority to and the benefit of Korean Patent Application No. 10-2017-0164085 filed on Dec. 1, 2017, and Korean Patent Application No. 10-2018-0151236 filed on Nov. 29, 2018 in the Korean Intellectual Property Office, the entire contents of which are incorporated herein by reference.

TECHNICAL FIELD

The present invention relates an electrode assembly and a secondary lithium battery including the same, and more particularly, to an electrode assembly for a high energy secondary lithium battery and a secondary lithium battery including the same.

BACKGROUND ART

Along with technological development and increased demands for various devices, demands for a secondary battery as an energy source have been remarkably increased, and among such secondary batteries, a secondary lithium battery with high energy density and voltage, a long cycle lifespan, and a low self discharging rate has been commercially available and widely used.

The secondary lithium battery generally uses lithium-containing cobalt oxide ($LiCoO_2$) with a layered crystalline structure, lithium-containing manganese oxide such as $LiMnO_2$ with a layered crystalline structure, and $LiMn_2O_4$ with a spinel crystalline structure, or lithium-containing nickel oxide ($LiNiO_2$), as a positive active material. In addition, the secondary lithium battery uses a carbon-based material as a negative active material, and recently, along with increase in demands for a high energy secondary lithium battery, use of a mixture with a silicon-based material, or a silicon oxide-based material with available capacitance of 10 times or greater than a carbon-based material has been considered.

For the development of a high energy secondary lithium battery according to a recent trend, it is required to use a negative electrode using a silicon-based material as a negative active material. However, a negative electrode using a silicon-based material has high non-reversible capacitance, and thus, there is a problem in terms of low charging/discharging efficiency.

To overcome the problem, research has been conducted on a method of manufacturing a battery by applying a positive electrode with which a high capacitance of non-reversible additive, for example, $Li_2O_2$ is mixed. However, as $Li_2O_2$ is decomposed to discharge oxygen gas through first charging, a void is formed in the corresponding point, and density of a positive electrode is lowered after first charging due to the formed void, and accordingly, there is a problem in that energy density of a battery is lowered.

DISCLOSURE

Technical Problem

An exemplary embodiment of the present invention provides an electrode assembly including a high-capacity non-reversible material coating layer instead of a positive active material layer present at the outermost portion of a positive electrode positioned on opposite surfaces of the outermost portion of a stack structure-type electrode assembly, and a secondary lithium battery including the same, in order to overcome a problem in the case in which a positive electrode obtained by mixing a high-capacity of non-reversible additive with a positive active material is used.

Technical Solution

According to an embodiment of the present invention, an electrode assembly is configured by alternately stacking two or more positive electrodes and one or more negative electrodes using a separator as a boundary therebetween, wherein outermost positive electrodes are positioned on outermost opposite surfaces of the electrode assembly, respectively, each of the outermost positive electrodes includes a positive electrode current collector, a positive active material layer formed on one surface of the positive electrode current collector, and a non-reversible material coating layer formed on the other surface of the positive electrode current collector and including lithium oxide, and the non-reversible material coating layer is positioned on an outermost surface of the electrode assembly.

Here, the non-reversible material coating layer may further include a catalyst, a conductive material, a binder, and the like in addition to lithium oxide that is a non-reversible material.

Content of the catalyst, the conductive material, and the binder may be 10 to 50 wt %, 1 to 20 wt %, and 1 to 20 wt %, respectively, based on a total weight of the non-reversible material coating layer.

The content may be appropriately selected according to a function thereof.

In this case, the lithium oxide may be $Li_2O_2$, $Li_2O$, $Li_2NiO_2$, or mixture thereof.

Here, $Li_2O_2$ or $Li_2O$ may be removed after first charging of a battery including the electrode assembly.

In detail, the lithium oxide may be $Li_2O_2$, or $Li_2NiO_2$, and in more detail, may be removed $Li_2O_2$.

The negative electrode may include a silicon (Si)-based material as a negative active material.

In this case, the silicon-based material may be a complex of silicon and silicon oxide, a silicon alloy, or a complex and silicon alloy of silicon oxide.

Another embodiment of the present invention provides a secondary lithium battery including an electrode assembly, a non-aqueous electrolyte for impregnating the electrode assembly, and a battery case for containing the electrode assembly and the non-aqueous electrolyte therein, wherein the electrode assembly is the electrode assembly as described above.

The present invention may provide a battery module including the secondary lithium battery as described above as a unit battery, a battery pack including the battery module, and a device including the battery pack as a power supply.

Here, the device may be an electric vehicle, a hybrid electric vehicle, a plug-in hybrid electric vehicle, or an electric power storage system.

DESCRIPTION OF THE DRAWINGS

The attached drawings are for exemplary embodiments of the present invention and are for description of the principle of the present invention along with the detailed description, and the scope of the present invention is not limited thereto.

Shapes, sizes, scales, ratios, or the like of the attached drawings of the specification may be exaggerated to emphasize clarity of the description.

MODE FOR INVENTION

The meaning of the terms used in the specification and the appended claims should not be construed as being confined to common or dictionary meaning, but should be construed as concepts not departing from the spirit and scope of the present invention in order to describe the present invention in the most appropriate way. Accordingly, the configuration shown with regard to embodiments described in the specification is merely an embodiment of the present invention and does not represent every technological idea of the present invention, and thus, it would be understood that the present invention may be changed in various equivalent embodiments and modifications at a time point when the application is filed.

To develop a high energy secondary lithium battery according to demands of requirements of the art to which the present invention pertains, a negative electrode using a silicon-based material as a negative active material needs to be used, and in this regard, the negative electrode has low charging/discharging efficiency due to high non-reversible capacitance, and thus, to overcome this, a positive electrode with which a high-capacity of non-reversible additive is mixed has been used.

Figure 1:
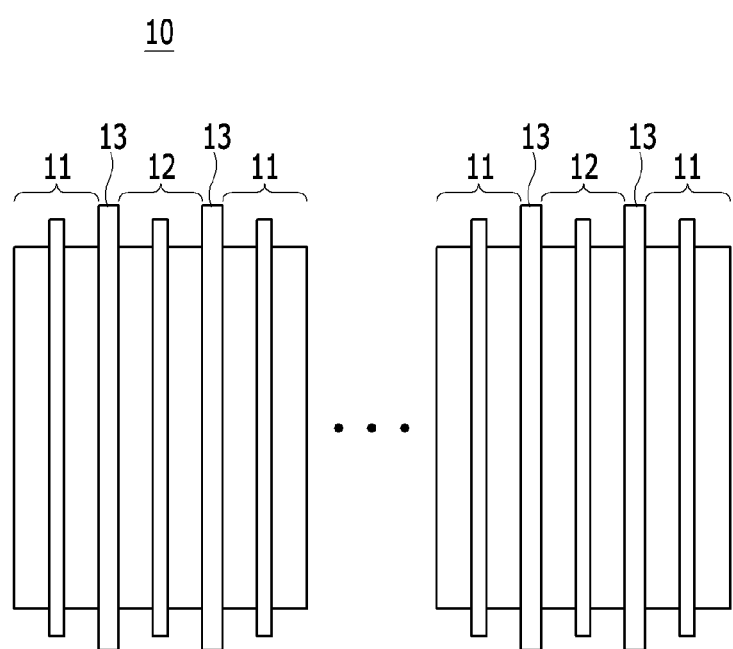
FIG. 1 is a schematic diagram of a conventional electrode assembly.

FIG. 1 is a schematic diagram of a conventional electrode assembly 10. Referring to the drawings, a high-capacity of non-reversible additive is mixed with a positive active material layer, and in this regard, as a high-capacity of non-reversible additive dispersed in a positive active material layer is decomposed through first charging, a void is formed in the corresponding point, and density of the positive active material layer is lowered due to the formed void, and ultimately, there is a problem in that energy density of a battery is lowered.

According to the present invention, a positive active material and a high-capacity of non-reversible additive are not mixed, but the aforementioned problem according to the conventional art may be overcome by forming a non-reversible material coating layer instead of a positive active material layer positioned on the outermost surface of an electrode assembly among positive electrodes positioned at the outermost portion of the electrode assembly.

Figure 2:
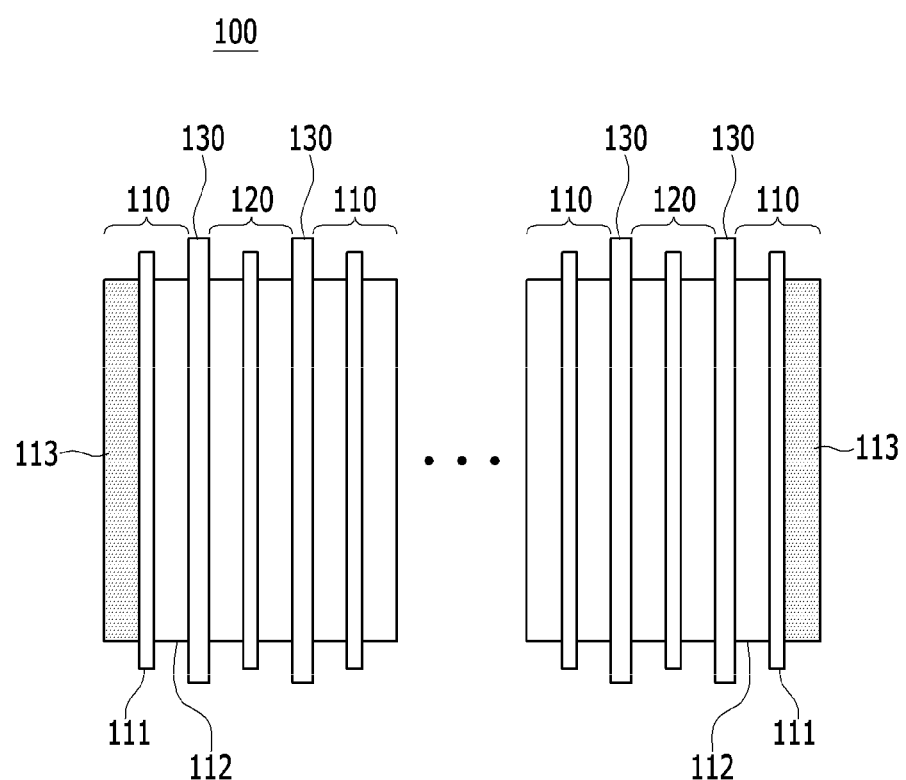
FIG. 2 is a schematic diagram of an electrode assembly according to an exemplary embodiment of the present invention.
Figure 3:
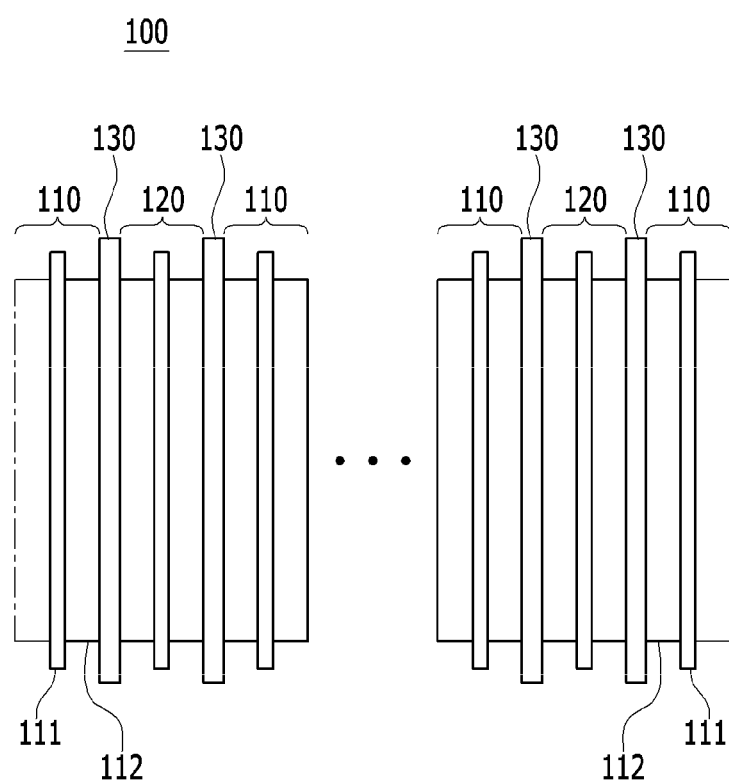
FIG. 3 is a schematic diagram of an electrode assembly after charging according to an exemplary embodiment of the present invention.

FIG. 2 is a schematic diagram of an electrode assembly according to an exemplary embodiment of the present invention. FIG. 3 is a schematic diagram of an electrode assembly after charging according to an exemplary embodiment of the present invention.

The present invention will be described in more detail with reference to the drawings. In an electrode assembly 100 configured by alternately stacking two or more positive electrodes 110 and one or more negative electrodes 120 with a separator 130 as a boundary, the outermost positive electrodes 110 may be positioned on the outermost opposite surfaces of the electrode assembly 100, respectively, the outermost positive electrodes 110 may each include a positive electrode current collector 111, a positive active material layer 112 formed on one surface of the positive electrode current collector 111, and a non-reversible material coating layer 113 formed on the other surface of the positive electrode current collector 111 and including lithium oxide, and the non-reversible material coating layer 113 may be positioned on the outermost surface of the electrode assembly 100.

The non-reversible material coating layer 113 including lithium oxide is positioned on the outermost surface of the electrode assembly 100 and non-reversible material is not included in the positive active material layer, and thus, a process of mixing the positive active material and the non-reversible material may not be required.

In this case, the lithium oxide may be $Li_2O_2$, $Li_2O$, $Li_2NiO_2$, or a mixture thereof.

Here, $Li_2O_2$ and $Li_2O$ may be removed after first charging of a battery including the electrode assembly. This is shown in FIG. 3.

In the non-reversible material coating layer 113 including the lithium oxide of $Li_2O_2$ or $Li_2O$, the materials may be removed after first charging of a secondary lithium battery including the electrode assembly 100. In this case, lithium oxide may be decomposed to lithium ions and oxygen gas and may be removed. The drawing is merely a schematic diagram for indicating a phenomenon whereby lithium oxide is removed, and needless to say, an adduct such as a catalyst, a conductive material, and a binder remains.

When $Li_2NiO_2$ is used, the material may remain without change along with materials such as a catalyst, a conductive material, and a binder.

The positive active material of the positive active material layer may include a lithium transition metal oxide represented by the following formula 1 or 2 below.

$$Li_xM_yMn_{2-y}O_{4-z}A_z \qquad (1)$$

In the above formula,

M includes one or more elements selected from the group consisting of Al, Mg, Ni, Co, Fe, Cr, V, Ti, Cu, B, Ca, Zn, Zr, Nb, Mo, Sr, Sb, W, Ti, and Bi;

A includes one or more negative monovalent or negative bivalent ions;

and $0.9 \leq x \leq 1.2$, $0 < y < 2$, and $0 \leq z < 0.2$.

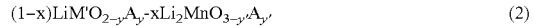
$$(1-x)LiM'O_{2-y}A_y\text{-}xLi_2MnO_{3-y'}A_{y'} \qquad (2)$$

In the above formula,

M' is $Mn_aM_b$;

M includes one or more elements selected from the group consisting of Ni, Ti, Co, Al, Cu, Fe, Mg, B, Cr, Zr, Zn, and group 2 transition metals;

A includes one or more selected from the group consisting of negative ions of $PO_4$, $BO_3$, $CO_3$, F, and $NO_3$; and $0 < x < 1$, $0 < y \leq 0.02$, $0 < y' \leq 0.02$, $0.5 \leq a \leq 1.0$, $0 \leq b \leq 0.5$, and $a+b=1$.

The positive active material layer may further include a binder and a conductive material other than a positive active material.

The positive electrode may be manufactured by coating and then drying an electrode mixture that is a mixture of a positive active material, a conductive material, and a binder on a portion of one surface or opposite surfaces of a positive electrode current collector except for a plain portion, but not on the outermost portion on which the non-reversible material coating layer is formed, and as necessary, a filler may be further included in the mixture.

In addition to lithium transition metal oxide represented by formula 1 or 2 above, the positive active material may further include a layered compound such as lithium cobalt oxide ($LiCoO_2$) or lithium nickel oxide ($LiNiO_2$), or a compound substituted with one or more transition metals; lithium manganese oxide such as chemical formula $Li_{1+x}Mn_{2-x}O_4$ (wherein x is 0 to 0.33), $LiMnO_3$, $LiMn_2O_3$, or $LiMnO_2$; lithium copper oxide ($Li_2CuO_2$), vanadium oxide such as $LiV_3O_8$, $LiFe_3O_4$, $V_2O_5$, or $Cu_2V_2O_7$; Ni site-type lithium nickel oxide represented by chemical formula $LiNi_{1-x}M_xO_2$ (wherein M=Co, Mn, Al, Cu, Fe, Mg, B, or Ga, and x=0.01 to 0.3); lithium manganese composite oxide represented by chemical formula $LiMn_{2-x}M_xO_2$ (wherein M=Co, Ni, Fe, Cr, Zn, or Ta, and x=0.01 to 0.1) or $Li_2Mn_3MO_8$ (wherein M=Fe, Co, Ni, Cu, or Zn); lithium manganese composite oxide of a spinel structure represented by $LiNi_xMn_{2-x}O_4$; $LiMn_2O_4$ in which an Li portion of the chemical formula is substituted with alkaline-earth metal ions; disulfide compound; $Fe_2(MoO_4)_3$, and so on, but are not limited thereto.

In this case, lithium transition metal oxide represented by formula 1 or 2 above may be included in 60 wt % to 100 wt % based on a total weight of the positive active material.

In general, the positive electrode current collector may be formed to a thickness of 3 to 500 μm. The positive electrode current collector is not particularly limited as long as a corresponding battery has high conductivity while a chemical change is not caused in the battery, and for example, may be formed of stainless steel, aluminum, nickel, titanium, bake carbon, or aluminum, or a material formed by surface-processing a surface of stainless steel with carbon, nickel, titanium, silver, or the like. A current collector may have fine protrusions and depressions formed on a surface thereof to enhance adherence of a positive active material, and may be formed in various forms such as a film, a sheet, a foil, a net, a porous body, a foaming body, and a non-woven fabric structure.

In general, the conductive material may be added in 1 to 50 wt % based on a total weight of a mixture including a positive active material.

The conductive material is not particularly limited as long as a corresponding battery has high conductivity while a chemical change is not caused in the battery, and for example, may use a conductive material including graphite such as natural graphite or artificial graphite; carbonblack such as carbonblack, acetylene black, ketjen black, channel black, furnace black, lamp black, or thermal black; conductive finer such as carbon fiber or metal fiber; metal powder such as fluoro carbon, aluminum, or nickel powder; conductive whisky such as zinc oxide and potassium titanate; conductive metal oxide such as oxidation titanium; and polyphenylene derivative.

The binder may be a component that facilitates coupling of an active material, a conductive material, and so on, and coupling of a current collector, and in general, may be added with 1 to 50 wt % based on a total weight of a mixture including a positive active material. An example of the binder may include poly vinylidene fluoride, polyvinylalcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonate EPDM, styrene butylene rubber, fluorine rubber, and various copolymers.

The filler may be selectively used as a component for suppressing expansion of a positive electrode, and is not particularly limited as long as the filler is formed of any material in a fiber phase while a chemical change is not caused in the battery, and may use a material in a fiber phase, for example, an olefin-based polymer such as polyethylene or polypropylene; glass fiber, or carbonfiber.

The negative electrode may be manufactured by coating and then drying an electrode mixture that is a mixture of a negative active material, a conductive material, and a binder on a portion of one surface or opposite surfaces of a negative electrode current collector except for a plain portion, and as necessary, a filler may be further included in the mixture.

The negative active material may include a silicon (Si)-based material, and the Si-based material may be a complex of silicon and silicon oxide and/or a silicon alloy.

In this case, the silicon-based material may be included in 0.1 wt % to 30 wt % based on a total weight of the negative active material.

The negative active material may further include a carbon-based material, and the carbon-based material may be included in 70 wt % or greater to 99.9 wt % or less based on a total weight of a negative active material, and accordingly, the carbon-based material may include one or more selected from the group consisting of crystalline artificial graphite, crystalline natural graphite, amorphous hard carbon, low crystalline soft carbon, carbon black, acetylene black, ketjen black, super P, graphene, and fiber-phase carbon, and in detail, may be crystalline artificial graphite and/or crystalline natural graphite.

In addition to the carbon-based material and the Si-based material, the negative active material may further include metal composite oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, group 1, 2, or 3 elements in the periodic table, halogen; $0 < x \leq 1$; $1 \leq y \leq 3$; $1 \leq z \leq 8$); lithium metal; lithium alloy; silicon-based alloy; tin-based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; an Li—Co—Ni-based material; titanium oxide; lithium titanium oxide, and the like, and is not limited thereto.

In general, the negative electrode current collector included in the negative electrode may be formed to a thickness of 3 to 500 μm. The negative electrode current collector and the extension current collector are not particularly limited as long as a corresponding battery has a conductivity while a chemical change is not caused in the battery, and for example, may be formed of copper, stainless steel, aluminum, nickel, titanium, or bake carbon, or a material formed by surface-processing a surface of copper or stainless steel with carbon, nickel, titanium, silver, or the like, or may use an aluminum-cadmium alloy or the like. Like the positive electrode current collector, the negative electrode current collector and the extension current collector may have fine protrusions and depressions formed on a surface thereof to enhance adherence of a negative active material, and may be formed in various forms such as a film, a sheet, a foil, a net, a porous body, a foaming body, and a non-woven fabric structure.

The separator may be interposed between the positive electrode and the negative electrode and may be formed of an insulating thin film with high ion transmittance and mechanical strength. In general, the separator may have a pore diameter of 0.01 to 10 μm and a thickness of 5 to 300 μm. The separator may use, for example, a sheet, non-woven fabric, or the like formed of an olefin-based polymer such as chemical resistance and hydrophobic polypropylene; glass fiber or polyethylene, and the like. When a solid electrolyte such as a polymer is used as the electrolyte, the solid electrolyte may also function as a separator.

According to another aspect of the present invention, a secondary lithium battery includes an electrode assembly, a non-aqueous electrolyte for impregnating the electrode assembly, and a battery case for containing the electrode assembly and the non-aqueous electrolyte therein, and the electrode assembly is the electrode assembly according to the present invention.

Here, the non-aqueous electrolyte may include a non-aqueous electrolyte and lithium salt, and the non-aqueous electrolyte may use a non-aqueous organic solvent, an organic solid electrolyte, an inorganic solid electrolyte, or the like, but is not limited thereto.

The non-aqueous-based organic solvent may use an aprotic organic solvent, for example, N-methyl-2-pyrrolidinone, propylene carbonate, ethylene carbonate, butylene carbonate, dimethyl carbonate, diethyl carbonate, gamma-butilo lactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, formic acid methyl, methyl acetate. phosphoric acid triester, trimethoxy methane, dioxolane derivative, sulfolane, methyl sulfolane, 1,3-dimethyl-2-imidazolidinone, propylene carbonate derivative, tetrahydrofuran derivative, ether, pyropionic acid methyl, or ethyl propionate.

The organic solid electrolyte may use a polymer including, for example, polyethylene derivative, polyethylene oxide derivative, polypropylene oxide derivative, phosphoric acid ester a polymer, poly agitation lysine(agitation lysine), polyester sulfide, polyvinyl alcohol, polyvinylidene fluoride, or ionic dissociable group.

The inorganic solid electrolyte may use, for example, nitride, halide, sulfate, or the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be a material that is appropriately dissolved in a non-aqueous based electrolyte and may use, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloro borane lithium, lower aliphatic carbonic acid lithium, 4 phenyl boric acid lithium, or imide.

For example, pyridine, triethylphosphite, triethanolamine, cyclic ether, ethylene diamine, n-glyme(glyme), hexa phosphoric acid tri amide, nitrobenzene derivative, sulfur, quinone imine dye, N-substituted oxazolidinone, N,N-substituted imidazolidine, ethylene glycol dialkyl ether, ammonium salt, pyrrole, 2-methoxy ethanol, aluminum trichloride, or the like may be added to the lithium salt-containing non-aqueous electrolyte in order to enhance charge and discharge characteristics, flame retardant, and so on. As necessary, to achieve non-combustibility, the lithium salt-containing non-aqueous electrolyte may further include a halogen-containing solvent such as carbon tetrachloride or trifluoride ethylene, and to improve keeping high temperature characteristic, the lithium salt-containing non-aqueous electrolyte may further include dioxidationcarbonate gas and may further include fluoro-ethylene carbonate (FEC), propene sultone (PRS), or the like.

As one detailed example, a lithium salt-containing non-aqueous electrolyte may be manufactured by adding lithium salt such as $LiPF_6$, $LiClO_4$, $LiBF_4$, or $LiN(SO_2CF_3)_2$ to a mixed solvent of cyclic carbonate of EC or PC that is a high dielectric solvent and linear carbonate of DEC, DMC, or EMC that is a low viscosity solvent.

According to another aspect of the present invention, a device may include a battery module including the secondary lithium battery as a unit battery, a battery pack including the battery module, and a device including a battery pack as a power supply.

Here, an example of the device may include an electric vehicle, a hybrid electric vehicle, a plug-in hybrid electric vehicle, or an electric power storage system, but is not limited thereto.

Hereinafter, embodiments will be described in detail for description of the present invention. However, the embodiments of the present invention may be embodied in many different forms and should not be construed as being limited to the embodiments set forth herein. The embodiments of the present invention are provided so that this invention will be thorough and complete, and will fully convey the concept of the invention to those skilled in the art.

Example 1

A positive electrode formation composition was prepared by mixing a positive active material ($LiNi_{0.4}Co_{0.3}Mn_{0.3}O_2$), a carbon black conductive material, and a PVdF binder with an N-methylpyrrolidone solvent with a weight ratio of 90:5:5, the positive electrode formation composition was coated to a thickness of 100 μm on one surface of an aluminum current collector with a thickness of 20 μm, a non-reversible material layer formation composition was prepared by mixing a mixture obtained by $Li_2O_2$ and a Pt catalyst in a ratio of 1:1, carbonblack, and PVdF in a weight ratio of 8:1:1, and the non-reversible material layer formation composition was coated to a thickness of 10 μm on the other surface of the aluminum current collector and then dried at 130° C. to prepare a positive electrode.

A negative electrode formation composition was prepared by mixing a mixture obtained by mixing mesocarbon microbead (MCMB) as artificial graphite and SiO in a weight ratio of 95:5 as a negative active material, a carbonblack conductive material, and a PVdF binder with a N-methylpyrrolidone solvent in a weight ratio of 85:10:5, was coated to a thickness of 100 μm on opposite surfaces of a copper current collector with a thickness of 20 μm, and then, was dried at 130° C. to manufacture a negative electrode.

A separation membrane of porous polyethylene was interposed between the positive electrode prepared as described and a negative electrode to prepare a bicell with a positive/negative/positive electrode structure in which a non-reversible material layer is disposed at the outermost portion as shown in FIG. 2, the electrode assembly was positioned in a case, and then, an electrolyte was injected into the case to prepare a secondary lithium battery. In this ca se, the electrolyte was prepared by dissolving lithiumhexafluorophosphate ($LiPF_6$) with concentration of 1.15 M in an organic solvent including ethylenecarbonate/dimethylcarbonate/ethylmethylcarbonate (mixing volume ratio=3/4/3 of EC/DMC/EMC).

Example 2

A secondary lithium battery was prepared in the same manner as in Example 1 except that $Li_2NiO_2$ was used as a material included in a non-reversible material layer.

Comparative Example 1

A secondary lithium battery was prepared in the same manner as in Example 1 except that a positive electrode formation composition was coated to a thickness of 100 µm on a section area of an aluminum current collector instead of formation of a non-reversible material layer.

Comparative Example 2

A secondary lithium battery was prepared in the same manner as in Example 1 except that a positive electrode formation composition was prepared by mixing a positive active material ($LiNi_{0.4}Co_{0.3}Mn_{0.3}O_2$), a non-reversible additive ($Li_2O_2$), a carbonblack conductive material, and a PVdF binder with a N-methylpyrrolidone solvent in a weight ratio of 90:5:2.5:2.5 and a positive electrode was manufactured by coating the positive electrode formation composition to a thickness of 100 µm on a section of an aluminum current collector.

Experimental Example

With regard to the secondary lithium batteries prepared in Examples 1 and 2 and Comparative Examples 1 and 2, an achieved capacitance value in the case of charging when an initial cycle proceeds under a current condition of C-rate of 0.1 in the range of a voltage of 2.50 V to 4.20 V.

TABLE 1

| | Charge capacitance (mAh/g) |
|---|---|
| Example 1 | 231.2 |
| Example 2 | 230.8 |
| Comparative Example 1 | 226.6 |
| Comparative Example 2 | 221.5 |

As seen from Table 1 above, capacitance is increased when a secondary lithium battery is manufactured according to the present invention. This means that energy density is increased.

Particularly, when the non-reversible additive is mixed with the positive active material to form an active material layer, capacitance may be more seriously degraded.

DESCRIPTION OF SYMBOLS 10, 100: electrode assembly
11, 110: positive electrode
12, 120: negative electrode
13, 130: separator
111: positive electrode current collector
112: positive active material layer
113: non-reversible material coating layer

INDUSTRIAL APPLICABILITY

According to the present invention, a non-reversible material coating layer including lithium oxide may be included instead of a positive active material layer present at the outermost portion of a positive electrode positioned on opposite surfaces of the outermost portion of a stack structure-type electrode assembly, thereby increasing energy density of a battery.

Particularly, unlike in the conventional art, a positive active material layer may not include a non-reversible additive, and thus, the conventional problem in terms of a void formed in a positive electrode and a phenomenon whereby energy density of a battery is degraded due to the problem may be overcome.

The invention claimed is:

1. An electrode assembly configured by alternately stacking two or more positive electrodes and one or more negative electrodes with a separator as a boundary therebetween,
wherein:
outermost positive electrodes are positioned on outermost opposite surfaces of the electrode assembly, respectively;
each of the outermost positive electrodes includes a positive electrode current collector, a positive active material layer disposed on one surface of the positive electrode current collector, and a non-reversible material coating layer disposed on an opposite surface of the positive electrode current collector and including lithium oxide as a non-reversible material;
the non-reversible material coating layer is positioned on an outermost surface of the electrode assembly;
the lithium oxide comprises one selected from the group consisting of $Li_2O_2$, $Li_2O$, $Li_2NiO_2$, and mixtures thereof; and
wherein the positive active material layer does not include the non-reversible material.

2. The electrode assembly of claim 1, wherein:
the lithium oxide comprises $Li_2O_2$ or $Li_2O$, and
the non-reversible material coating layer does not include $Li_2O_2$ or $Li_2O$ after first charging of a battery due to a decomposition of $Li_2O_2$ or $Li_2O$ into a lithium ion and oxygen gas.

3. The electrode assembly of claim 1, wherein:
the negative electrode includes a silicon (Si)-based material as a negative active material.

4. The electrode assembly of claim 3, wherein:
the silicon-based material comprises one selected from the group consisting of a complex of silicon and silicon oxide; a silicon alloy; and a mixture of the complex and the silicon alloy.

5. The electrode assembly of claim 1, wherein the non-reversible material is $Li_2NiO_2$.

6. The electrode assembly of claim 1, wherein the positive active material layer includes a positive active material that includes a lithium transition metal oxide represented by the formula 1 or 2:

$$Li_xM_yMn_{2-y}O_{4-z}A_z \quad (1)$$

wherein in formula (1),
M includes one or more elements selected from the group consisting of Al, Mg, Ni, Co, Fe, Cr, V, Ti, Cu, B, Ca, Zn, Zr, Nb, Mo, Sr, Sb, W, Ti, and Bi;
A includes one or more negative monovalent or negative bivalent ions; and
$0.9 \leq x \leq 1.2$, $0 < y < 2$, and $0 \leq z < 0.2$, or

$$LiM'O_{2-y}A_y\text{-}xLi_2MnO_{3-y'}A_{y'} \quad (2)$$

wherein in formula (2),
M' is $Mn_aM_b$;
M includes one or more elements selected from the group consisting of Ni, Ti, Co, Al, Cu, Fe, Mg, B, Cr, Zr, Zn, and group 2 transition metals;
A includes one or more selected from the group consisting of negative ions of $PO_4$, $BO_3$, $CO_3$, F, and $NO_3$; and
$0 < x < 1$, $0 < y \leq 0.02$, $0 < y' \leq 0.02$, $0.5 \leq a \leq 1.0$, $0 \leq b \leq 0.5$, and $a+b=1$.

7. The electrode assembly of claim 6, wherein the lithium transition metal oxide represented by formula 1 or 2 included in the positive active material layer is in an amount of 60 wt% to 100 wt% based on a total weight of the positive active material.

8. The electrode assembly of claim 1, wherein the positive electrode current collector has a thickness of 3 to 500 μm.

9. A secondary lithium battery comprising:
the electrode assembly of claim 1;
a non-aqueous electrolyte which impregnates the electrode assembly; and
a battery case containing the electrode assembly and the non-aqueous electrolyte therein.

10. A battery module comprising the secondary lithium battery of claim 9 as a unit battery.

11. A battery pack comprising the battery module of claim 10.

12. A device comprising the battery pack of claim 11 that is a power supply of the battery module.

13. The device of claim 12, wherein:
the device comprises one selected from the group consisting of an electric vehicle, a hybrid electric vehicle, a plug-in hybrid electric vehicle, and an electric power storage system.

14. A method of preparing a positive electrode, comprising:
preparing an electrode mixture comprising a positive active material, a conductive material, and a binder;
coating the electrode mixture on a portion of one surface of a positive electrode current collector to form a positive active material layer; and
forming a non-reversible material coating layer on an opposite surface of the positive electrode current collector as a outermost potion of the positive electrode, wherein
the non-reversible material coating layer comprises a lithium oxide as a non-reversible material;
the lithium oxide comprises one selected from the group consisting of $Li_2O_2$, $Li_2O$, $Li_2NiO_2$, and mixtures thereof; and
wherein the positive active material layer does not include the non-reversible material.

15. The method of claim 14, wherein:
the lithium oxide comprises $Li_2O_2$ or $Li_2O$, and
the $Li_2O_2$ or $Li_2O$ is removed from the non-reversible material coating layer after first charging of a battery by decomposition of $Li_2O_2$ or $Li_2O$ into lithium ions and oxygen gas.

16. The method of claim 14, wherein the non-reversible material is not included in the positive active material layer.

17. The method of claim 14, wherein the non-reversible material is $Li_2NiO_2$.

* * * * *